Patented Aug. 25, 1953

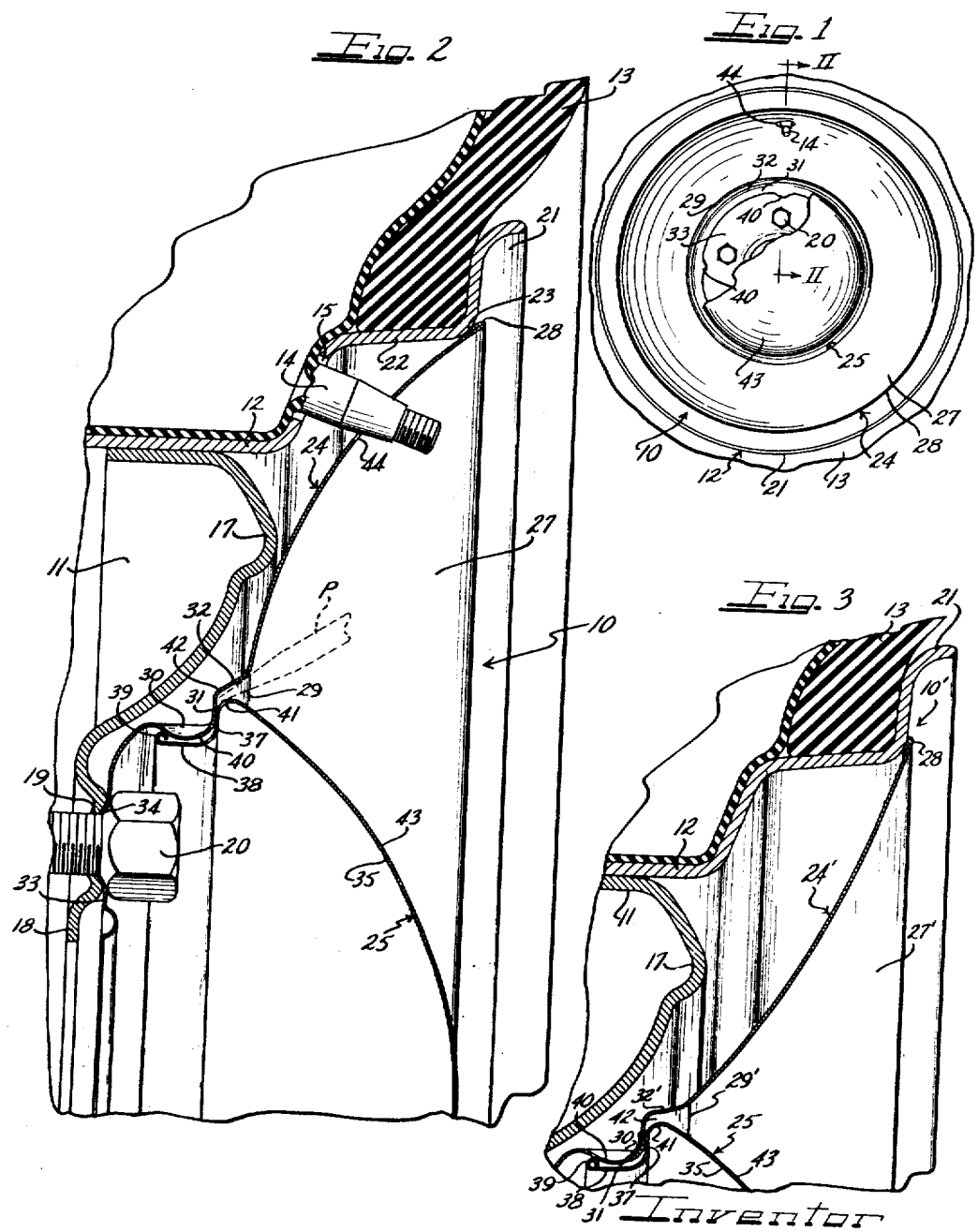

2,650,134

UNITED STATES PATENT OFFICE 2,650,134

WHEEL COVER

George Albert Lyon, Detroit, Mich.

Application October 12, 1948, Serial No. 54,166

10 Claims. (Cl. 301—37)

This invention relates to improvements in wheel structures, and more particularly, relates to improvements in ornamental and protective cover structures for the outer sides of vehicle wheels such as automobile wheels, or the like.

An important object of the present invention is to provide a novel multi-part cover structure for the outer side of a vehicle or like wheel.

Another object of the invention is to provide a novel wheel cover of unusually attractive and ornamental value.

A further object of the invention is to provide a multi-part ornamental wheel cover in which one of the wheel parts is adapted to be secured in association with a vehicle wheel while another part is adapted to be supported by the wheel-attached part in snap-on, pry-off relationship.

Still another object of the invention is to provide in an ornamental multi-part vehicle wheel cover improved means for effecting snap-on, pry-off assembly of the cover components.

Yet another object of the invention is to provide in a multi-part, separable wheel cover assembly improved means for effecting pry-off leverage conveniently and efficiently and without danger of marring any ornamental surface of the wheel cover.

According to the general features of the invention, there is provided in a wheel structure including a tire rim and a load-sustaining body part and wherein the body part includes a central bolt-on flange, a cover for the outer side of the wheel including an annular portion of a magnitude and extent to substantially conceal the tire rim and extending generally radially and axially inwardly from the tire rim, said circular cover member having a generally axially inwardly extending portion adjacent to the bolt-on flange of the wheel body and terminating at its axially inner terminus in a generally radially inwardly extending bolt-on flange registering with the bolt-on flange of the wheel body and secured thereto by means of the wheel attachment bolts, said axially extending portion of the annular cover member having at its axially outer terminus a generally rabbet groove annular juncture with the remainder of the annular cover member with the axially outer terminus of the rabbet groove being defined by an annular reinforcing rib projecting generally axially outwardly, said axially extending portion having a plurality of radially inwardly extending cover attachment bumps, and a hub cap member including a marginal angular radially inwardly extending and axially inwardly projecting retaining flange having a beaded terminus and engaging said retaining bumps retainingly with the radially extending portion of the flange seating in said rabbet groove formation, the diameter of the hub cap being substantially less than the diameter of the rabbet groove formation, whereby to afford a pry-off tool gap between said reinforcing rib and the edge of the hub cap to facilitate the insertion of a pry-off tool into engagement with the edge of the hub cap with the rib serving as a pry-off tool fulcrum.

According to other features of the invention, the portion of the outer cover member intermediate its outer extremity and said reinforcing rib is of a large radius concave cross-section.

According to yet other features of the invention, the portion of the outer cover member radially outwardly from the reinforcing rib is of relatively large radius convex cross-section.

Other general features of the invention comprehend the provision of an ornamental wheel cover including a radially outer annular portion extending radially and axially inwardly and providing a generally radially inwardly and axially outwardly facing reflecting surface, and a central crown portion protruding outwardly from the radially inner margin of said outer portion to approximately the plane of the radially outer edge of said outer portion and affording an outer surface exposed throughout its major extent to said reflecting surface of the outer portion of the cover.

According to another feature of the invention, the reflecting surface of the outer portion of the cover comprises a highly polished stainless steel surface and the outer surface of said crown portion being gold-plated and the reflection thereof from the polished surface of the outer portion of the cover affording the appearance of gold plate on said outer portion as well.

Other objects, features and advantages of the present invention will be readily apparent from the following detailed description of certain preferred embodiments thereof, taken in conjunction with the accompanying drawings in which:

Figure 1 is a fragmentary side elevational view of a vehicle wheel carrying a cover assembly according to the present invention;

Figure 2 is an enlarged fragmentary radial sectional view taken substantially on the line II—II of Figure 1; and Figure 3 is a fragmentary radial sectional view through a wheel and cover structure showing a slightly modified form of cover.

As shown on the drawing:

Having reference to Figures 1 and 2, a cover assembly 10 embodying features of the invention is constructed and arranged to be mounted in ornamental, protective relationship at the outer side of a vehicle wheel such as an automobile wheel which comprises a body portion 11 and a tire rim 12, the latter being of the conventional multi-flange type for supporting a pneumatic tire and tube assembly 13. A valve stem 14 is adapted to project through a valve stem aperture 15 in the outer side flange of the tire rim. Both the wheel body and the tire rim are adapted to be made from suitable gauge sheet metal by stamping and rolling processes of manufacture.

The wheel body 11 is assembled in the usual or preferred manner with the base flange of the tire rim as by welding or riveting and has a reinforcing intermediate annular rib portion 17 which, in assembly with the tire rim, extends no further axially outwardly than, and preferably, not quite as far axially outwardly as the juncture of the base flange and side flange of the tire rim. Radially inwardly of the rib 17, the wheel body is relatively deeply dished and projects radially and axially inwardly to a bolt-on flange 18 which lies close to and preferably axially inwardly of the center line or median plane of the tire rim. Appropriate bolt apertures 19 in the bolt-on flange 18 afford passage for the shanks of shouldered attachment bolts 20 by which the wheel is attached to the axle or hub structure of the vehicle with which associated.

At its axially outer side, the tire rim 12 has a terminal flange 21 which joins an intermediate flange 22 at a shoulder 23 against which a portion of the cover 10 is adapted to engage in assembly.

According to the present invention, the cover 10 comprises an outer cover annulus 24 and an inner circular crown portion or member or hub cap 25. These portions or members of the cover are adapted to be assembled as separable components, the outer portion or member 24 being adapted to be attached to the wheel and the inner portion or member 25 being adapted to engage with the outer component in snap-on, pry-off relation.

Furthermore, the construction and relationship of the cover components 24 and 25 is such that they will afford an unusually attractive ornamental appearance wherein the color of the inner and smaller portion or component of the cover is reflected onto and from the outer and larger cover portion or component in a manner that affords the illusion of a cover in which both the inner and outer portions are of substantially the same external appearance. Thus, where the inner cover component 25 is gold-plated on its outer surface, the outer cover member will reflect the color of the inner cover member and thus also appear as though gold-plated.

The construction and relationship of the cover components is also such that although they are effectively assembled in snap-on, pry-off relationship, pry-off can be effected quickly, easily and efficiently without marring or damaging the cover components as an incident to pry-off.

To the attainment of these desirable ends, the outer cover component 24 is formed of relatively deeply dished shape with an annular portion 27 of preferably concave cross-section extending from a radially outer edge having a turned-under reinforcing flange 28 relatively steeply axially and radially inwardly to a reinforcing annular rib 29, the span of the portion 27 being such as to substantially cover the outer side of the tire rim 12 and a substantial portion of the wheel body 11. In assembly with the wheel, the reinforced outer margin 28 of the wheel cover portion 27 may engage against the tire rim shoulder 23, with the terminal flange 21 of the tire rim projecting axially outwardly substantially beyond the edge 28 and thus affording substantial protection against curbing or other damage to the edge 28 while in service.

The inward sweep of the cover portion 27 is such that it clears the reinforcing rib 17 of the wheel body and extends radially and axially inwardly thereby to a substantial extent into the bolt-on flange depression of the wheel body.

Extending axially inwardly, preferably substantially cylindrically, adjacent to the inner terminus of the cover portion 27 is a flange portion 30 joined with the portion 27 by a substantially rabbet groove formation including a generally radially outwardly extending flange 31 at the axially outer terminus of the flange 30 and a generally axially outwardly and preferably radially outwardly tilted flange 32 which finds juncture with the cover portion 27 by way of the reinforcing rib 29. At its axially inner terminus, the flange 30 joins a generally radially inwarding extending bolt-on flange 33. The bolt-on flange 33 has appropriate apertures 34 which register with the bolt apertures 19 of the bolt-on flange 18 of the wheel body so that the bolts 20 secure the bolt-on flange 33 to the bolt-on flange 18 as an incident to attachment of the wheel to the vehicle. By preference, the construction is such that the bolt-on flange 33 in the initial assembly of the cover, and before the bolts 20 are drawn up, is spaced from the bolt-on flange 18 of the wheel body so that as the bolts are drawn up the cover is flexed at least slightly axially inwardly and a tight, rattle-free relationship is attained between the cover and the wheel, with the bolt-on flange held against the wheel body and the outer edge 28 of the cover member 24 held snug against the shoulder 23 of the tire rim, the remainder of the cover member 24 remaining in spaced relation to both the tire rim and the wheel body.

The central cover member or portion 25 is in the form of a hub cap which comprises a crown portion 35 of convex shape and with its margin turned under and radially inwardly as at 37 and then axially inwardly to provide a retaining flange 38, the axially inner terminal of which is formed with an outturned reinforcing and retaining bead 39. The diameter of the retaining flange 38 is less than the diameter of the axial flange portion 30 of the outer cover member so as to afford clearance for reception of the bead 39 between the flanges for engagement with radially inwardly directed retaining means in the form of integral cover-retaining bumps 40 pressed radially inwardly in the flange 30. The bumps 40 are preferably at least slightly longer in an axial direction than the length of the flange 38 so that when the central cover member 25 is assembled with the outer cover member 24 by pressing the central cover member coaxially inwardly, the bead 39 flexes over and passes the retaining bump peaks and by engaging in camming retaining relation with the axially inner ends of the bumps draws the radial flange portion 37 into snug seating relation with the flange portion 31 of the outer cover member.

At the radial extremity of the cover member 25 where the crown 35 joins the inturned radial seating flange 37, a rounded reinforcing marginal rib 41 is provided which is of smaller external diameter than the diameter of the radially outer groove wall 32 of the rabbet groove in the outer cover member within which the central cover member seats. This affords a substantial space between the flange 32 and the marginal rib 41, which space is identified at 42 and within which the end of a pry-off tool P, such as a screwdriver, is adapted to be conveniently inserted. In manipulating the pry-off tool, it is fulcrumed against the reinforcing rib 29 which is spaced axially and radially outwardly from the reinforcing and pry-off rib 41 of the inner cover member, but with the ribs 29 and 41 yet so relatively closely disposed that quite short, and thus powerful leverage is exerted by the pry-off tool tip when the remainder of the relatively long pry-off lever is manipulated to fulcrum on the rib 29. It will be appreciated that the fulcrum rib 29 avoids leverage of the pry-off tool P against the reflecting surface portion 35 of the outer cover member 34 so that this surface is saved from being marred by indentation or scratching in the operation of the pry-off tool.

By reason of the deeply dished formation of the outer cover member 24, the seat afforded by the flange portion 31 thereof for the outer cover member 25, is disposed relatively close to the median plane or center line of the wheel, and it is thereby possible to have the crown portion 35 disposed well inside the axially outer extremity of the terminal flange 21 of the tire rim so that a high degree of protection against curbing damage is afforded for the crown.

As best seen in Figure 2, the axially outer extremity or peak of the crown portion 35 extends to approximately the plane of the axially outer extremity of the outer cover member 24 afforded by the edge 28 thereof.

The arrangement whereby the crown portion 35 of the inner cover member is set deeply into the dished surrounding outer cover member, also affords the advantage that by having the axially outer surface of the cover portion 27 of the outer cover member of a highly polished, substantially mirror-like finish, any contrasting finish on the exterior surface of the crown portion 35 is reflected onto the reflecting surface of the portion 27 and is visibly reflected to the beholder. This gives the illustration of a cover in which substantially the entire outer surface is finished in accordance with the finish on the exterior surface of the crown portion 35. In a practical example, the axially outer surface of the crown portion 35 has been supplied with a gold-plated finish 43 which is obviously of highly deluxe ornamental value, and by reason of the reflection of the gold finish by the polished reflecting surface of the outer cover portion 27, the highly attractive illusion has been created of a cover in which substantially the entire surface, inclusive of the surface of the portion 27, is of gold finish. Since gold plating is expensive, it will be appreciated that a very important advantage is thus gained, since only the relatively small area of the inner cover crown 35 need be plated and by reflection of the gold finish thereon by the relatively much larger area afforded by the outer cover portion 27, the appearance of an all-gold cover is afforded.

A relatively inexpensive, substantially tarnishproof reflecting surface for the cover portion 27 is attainable by making the outer cover member 24 from stainless steel sheet material and then highly polishing the outer surface of the portion 27 to give it a natural high lustrous reflecting finish.

For passage of the valve stem 14, the outer cover member 43 may appropriately be formed with a valve stem aperture 44.

In assembling the cover 10 with the wheel, the outer cover portion 24 is applied to the wheel before the inner cover member 25 is assembled with the outer cover member. In accomplishing this, the outer cover member 24 is applied substantially coincident with attachment of the wheel to the vehicle by means of the attachment bolts 20, drawing up of the bolts 20 also drawing the bolt-on flange 33 of the outer cover member into engagement with the central bolt-on flange 18 of the wheel and thus placing the outer cover member 24 under tensioned engagement between the tire rim shoulder 33 and the bolt-on flange 18. Thereafter, the inner cover member 25 is applied by centering the same relative to the outer cover member 24 and pressing axially inwardly thereon to engage the retaining and reinforcing bead 39 with the retaining bumps 40, the latter being in equal number and equally spaced, such as four, so that the inner cover member 25 is held centered within the rabbet groove formation 31, 32 affording a seat therefor in the outer cover member. When it is desired to gain access to the wheel attaching bolts 20, it is a relatively simple matter to apply the pry-off tool P between the shoulders 29 and 41 of the cover members and pry the inner cover member from the assembly.

Where greater clearance is desired between the wheel and the trim ring radially outer portion of the outer cover member, the modification shown in Figure 3 may be used. Since in this modification most of the elements are identical with the cover 10 of Figures 1 and 2, similar reference numerals are applied to indicate that the description thereof should be read coincident with the description of Figures 1 and 2. In the form of Figure 3, however, the cover 10' has the outer cover member or portion 24' formed with a convex radially outer portion rather than a concave radially outer portion 27 as in Figures 1 and 2. The curvature of the portion 27' is on a relatively large radius so that it affords a good reflecting surface by which the color of the opposing surface of the crown 35 of the inner cover member is adequately reflected, at least throughout the major extent of the portion 27' from juncture with the crown to adjacent the radially outer extremity of the portion 27'. Due to the convex curvature of the portion 27', however, the radially outer extremity area of this portion will not reflect the color of the crown as intensely as the area radially inwardly from such extremity and which area more adequately opposes the surface of the crown. In this way, the radially outer extremity of the portion 27' is adapted to show a border of the natural color of the portion 27', that is, a bright metallic, more or less silvery appearance contrasting with the gold color reflected by the radially inner area of the portion 27', where the crown 35 is provided with the gold plating 43.

At the radially inner edge of the reflecting surface portion 27' of the outer cover member, it joins the radially outer and generally axially extending rabbet flange portion 32' by way of the juncture rib 29' which is spaced both radially and axially outwardly relative to the reinforcing marginal rib 41 of the inner or hub cap cover member 25 whereby a pry-off tool can be radially inserted in the pry-off tool clearance 42 for prying the inner cover member free from the outer cover member in the same manner as described in connection with Figures 1 and 2, the rib 29' serving as a pry-off tool fulcrum and as a protection against damage of the surface of the cover portion 27' by the pry-off tool.

The cover 10', similarly as the cover 10, is adapted to be attached to the wheel through the medium of the wheel attaching bolts.

In both forms of the cover, the deeply dished construction of the wheel, whereby substantially clear access is had from the shoulder of the tire rim to the bolt-on flange enables the substantially corresponding deeply dished and relatively wide arrangement of the trim ring outer portion of the cover and thus enhances the ornamental reflecting qualities of such portion.

I claim as my invention:

1. In a wheel structure including a tire rim and a load-sustaining body part and wherein the body part includes a central bolt-on flange, a cover for the outer side of the wheel including an annular portion of a magnitude and extent to substantially conceal the tire rim and extending generally radially and axially inwardly from the tire rim, said cover having a generally axially inwardly extending portion adjacent to the bolt-on flange of the wheel body and terminating at its axially inner terminus in a generally radially inwardly extending bolt-on flange registering with the bolt-on flange of the wheel body and secured thereto by means of the wheel attachment bolts, said axially extending portion of the cover having at its axially outer terminus a generally rabbet groove annular juncture with the remainder of the cover with the axially outer terminus of the rabbet groove being defined by an annular reinforcing rib projecting generally axially outwardly, said axially extending portion having a plurality of radially inwardly extending cover attachment bumps, and a hub cap member including a marginal angular radially inwardly extending and axially inwardly projecting retaining flange having a beaded terminus and engaging said retaining bumps retainingly with the radially extending portion of the flange seating in said rabbet groove formation, the diameter of the hub cap member being substantially less than the diameter of the rabbet groove formation, whereby to afford a pry-off tool gap between said reinforcing rib and the edge of the hub cap member to facilitate the insertion of a pry-off tool into engagement with the edge of the hub cap member with the rib serving as a pry-off tool fulcrum.

2. In a wheel structure including a tire rim and a load-sustaining body part and wherein the body part includes a central bolt-on flange, a cover for the outer side of the wheel including an annular portion of a magnitude and extent to substantially conceal the tire rim and extending generally radially and axially inwardly from the tire rim, said cover having a generally axially inwardly extending portion adjacent to the bolt-on flange of the wheel body and terminating at its axially inner terminus in a generally radially inwardly extending bolt-on flange registering with the bolt-on flange of the wheel body and secured thereto by means of the wheel attachment bolts, said axially extending portion of the cover having at its axially outer terminus a generally rabbet groove annular juncture with the remainder of the cover with the axially outer terminus of the rabbet groove being defined by an an annular reinforcing rib projecting generally axially outwardly, said axially extending portion having a plurality of radially inwardly extending cover attachment bumps, and a hub cap member including a marginal angular radially inwardly extending and axially inwardly projecting retaining flange having a beaded terminus and engaging said retaining bumps retainingly with the radially extending portion of the flange seating in said rabbet groove formation, the diameter of the hub cap member being substantially less than the diameter of the rabbet groove formation, whereby to afford a pry-off tool gap between said reinforcing rib and the edge of the hub cap member to facilitate the insertion of a pry-off tool into engagement with the edge of the hub cap member with the rib serving as a pry-off tool fulcrum, the portion of the cover intermediate its outer extremity and said reinforcing rib being of a large radius concave cross-section.

3. In a wheel structure including a tire rim and a load-sustaining body part and wherein the body part includes a central bolt-on flange, a cover for the outer side of the wheel including an annular portion of a magnitude and extent to substantially conceal the tire rim and extending generally radially and axially inwardly from the tire rim, said cover having a generally axially inwardly extending portion adjacent to the bolt-on flange of the wheel body and terminating at its axially inner terminus in a generally radially inwardly extending bolt-on flange registering with the bolt-on flange of the wheel body and secured thereto by means of the wheel attachment bolts, said axially extending portion of the cover having at its axially outer terminus a generally rabbet groove annular juncture with the remainder of the cover with the axially outer terminus of the rabbet groove being defined by an annular reinforcing rib projecting generally axially outwardly, said axially extending portion having a plurality of radially inwardly extending cover attachment bumps, and a hub cap member including a marginal angular radially inwardly extending and axially inwardly projecting retaining flange having a beaded terminus and engaging said retaining bumps retainingly with the radially extending portion of the flange seating in said rabbet groove formation, the diameter of the hub cap member being substantially less than the diameter of the rabbet groove formation, whereby to afford a pry-off tool gap between said reinforcing rib and the edge of the hub cap member to facilitate the insertion of a pry-off tool into engagement with the edge of the hub cap member with the rib serving as a pry-off tool fulcrum, the portion of the cover radially outwardly from the reinforcing rib being of relatively large radius convex cross-section.

4. In a cover assembly for disposition at the outer side of a vehicle wheel, an annular cover member of relatively deeply dished shape including a radially and axially inwardly extending trim ring portion and a hub cap retaining shoulder at the radially inner extremity of said trim ring portion, and a hub cap member retainingly engageable with said shoulder and having a crown extending axially outwardly to substantially the plane of the radially and axially outer extremity of said trim ring portion, said annular cover member having a generally outwardly opening groove at said hub cap shoulder providing a pry-off tool clearance between the radial extremity of the hub cap and the radially inner extremity of said trim ring portion, said radially inner extremity of said trim ring portion having a pry-off tool fulcrum and reinforcing annular rib at the radially outer side of said clearance groove angularly related to the general plane of the trim ring portion and disposed to afford a fulcrum against which a pry-off tool can be levered without engaging the surface of the trim ring portion radially outwardly from the rib.

5. As an article of manufacture, a composite wheel cover including an annular trim ring portion having an intermediate stepped shoulder formation including an axially outwardly facing seat portion and a radially inwardly facing flange portion, a bolt-on flange extending radially inwardly from the axially inner terminus of said flange portion, retaining bumps extending radially inwardly from said axial flange portion, and a hub cap including a radially inwardly turned seating shoulder flange and a generally axially inwardly extending retaining flange, said hub cap seating with said shoulder flange against said shoulder portion and said axially extending retaining flange engaging in snap-on, pry-off relation with said bumps.

6. As an article of manufacture, a composite wheel cover including an annular trim ring portion having an intermediate stepped shoulder formation including an axially outwardly facing seat portion and a radially inwardly facing flange portion, a bolt-on flange extending radially inwardly from the axially inner terminus of said flange portion, retaining bumps extending radially inwardly from said axial flange portion, and a hub cap including a radially inwardly turned seating shoulder flange and a generally axially inwardly extending retaining flange, said hub cap seating with said shoulder flange against said shoulder portion and said axially extending retaining flange engaging in snap-on, pry-off relation with said bumps, said seating portion extending to a larger diameter than the radial extremity of the hub cap and joining the remainder of the annular cover member on a reinforcing rib serving as a fulcrum for a pry-off tool for dislodging the hub cap from the annular cover member.

7. In a wheel structure including a multi-flange tire rim and a wheel body, the wheel body being relatively deeply dished and inset within the outer side flange of the tire rim, and a cover assembly including an annular cover member engaging the outer side of the tire rim and extending axially and radially inwardly to and engaging at the central portion of the wheel body and remaining entirely out of contact with the remainder of the wheel body, the radially inner portion of the annular cover member having a hub cap shoulder of stepped formation including an axially outwardly facing surface disposed in a generally radial plane angular to the surface of the annular cover member radially outwardly therefrom and spaced axially outwardly from the portion of the member engaging the central portion of the wheel body, and a hub cap seated on said axially outwardly facing surface and retained in engagement with said stepped shoulder.

8. In a wheel structure including a multi-flange tire rim and a wheel body, the wheel body being located axially inwardly of the axially outer terminus of the base flange of the tire rim and being substantially dished and having a bolt-on flange at approximately the median plane of the wheel, a dished wheel cover member engaging at its radially outer margin against the terminal flange of the tire rim and having a bolt-on flange registering with the bolt-on flange of the wheel, the intermediate portion of the annular cover member between the radially outer margin and the bolt-on flange being entirely clear of the tire rim and the wheel, wheel attaching bolts clamping said bolt-on flange under tension against the bolt-on flange of the wheel body, and a hub cap retainingly assembled with the annular cover member adjacent to and in concealing relation relative to the bolt-on flange of the annular cover member.

9. As an article of manufacture, a composite wheel cover including a circular portion having an intermediate stepped formation including an axially outwardly facing seat portion and a radially facing axially inwardly extending flange portion, a flange extending radially from the axially inner terminus of said flange portion for engagement by means on a wheel for attachment of the cover to the wheel, retaining bumps extending radially from said axially inwardly extending flange portion, a second circular cover member including a radially underturned seating shoulder flange and a generally axially inwardly extending retaining flange, said second circular cover member seating with said shoulder flange against said seat portion, and said axially extending retaining flange having means engaging in press-on, pry-off relation with said bumps.

10. As an article of manufacture, a composite wheel cover including a circular portion having an intermediate stepped formation including an axially outwardly facing seat portion and a radially facing axially inwardly extending flange portion, a flange extending radially from the axially inner terminus of said flange portion for engagement by means on a wheel for attachment of the cover to the wheel, and a second circular cover member including a radially underturned seating shoulder flange and a generally axially inwardly extending retaining flange, said second circular cover member seating with said shoulder flange against said seat portion and said axially extending retaining flange having means thereon engaging in press-on, pry-off relation with said axially inwardly extending flange portion.

GEORGE ALBERT LYON.

References Cited in the file of this patent
UNITED STATES PATENTS

| Number | Name | Date |
|---|---|---|
| D. 141,901 | Lyon | July 31, 1945 |
| 2,368,230 | Lyon | Jan. 30, 1945 |
| 2,368,246 | Lyon | Jan. 30, 1945 |
| 2,401,492 | Lyon | June 4, 1946 |